Jan. 17, 1961   W. L. WYMAN ET AL   2,968,715
FUSION WELDING METHOD AND APPARATUS
Filed Jan. 27, 1959
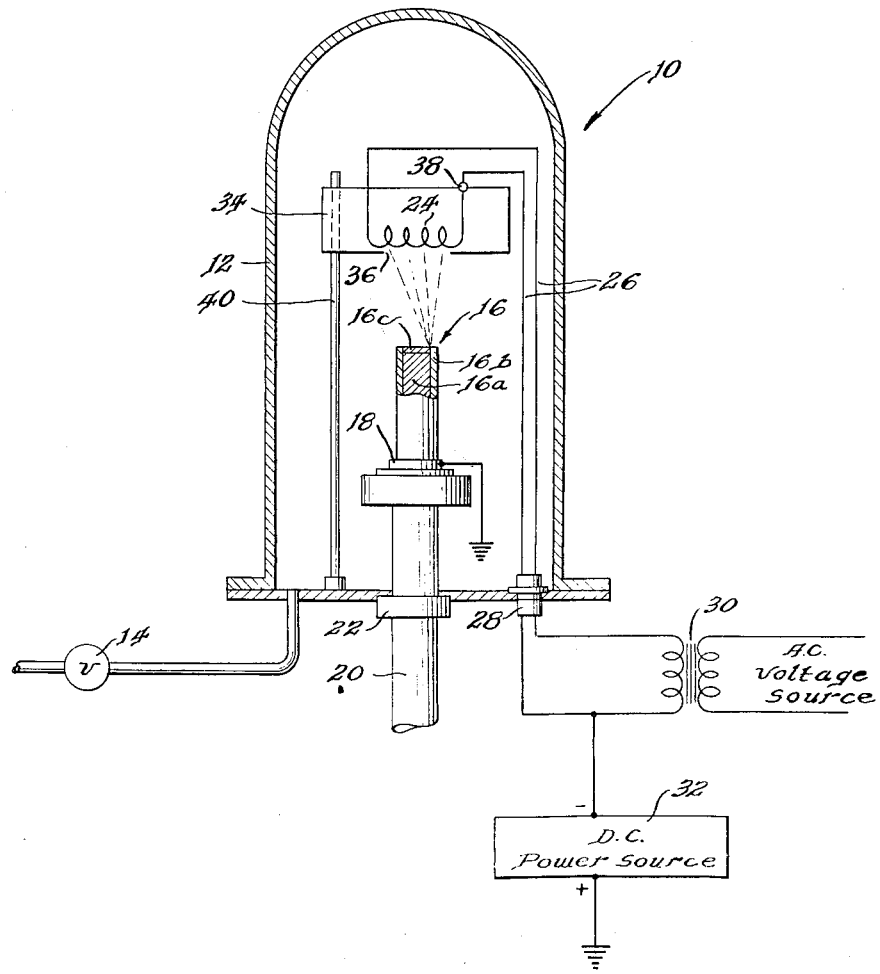
INVENTORS
Walter L. Wyman
William I. Steinkamp
BY
Roland G. Anderson
Attorney 2,968,715
Patented Jan. 17, 1961

2,968,715

FUSION WELDING METHOD AND APPARATUS

Walter L. Wyman and William I. Steinkamp, Richland, Wash., assignors to the United States of America as represented by the United States Atomic Energy Commission Filed Jan. 27, 1959, Ser. No. 789,457

5 Claims. (Cl. 219—117)

This invention relates to methods and apparatus for fusion welding. More particularly this invention relates to methods and apparatus for fusion welding which are especially useful in the fabrication of components for the atomic energy and rocket fields.

As the atomic energy and rocket fields have expanded the requirements for materials such as zirconium, titanium, molybdenum, and their alloys, have emerged from the stage of rare metals found in the development laboratories into standard production line materials used on a large scale. The use of these metals in large scale quantities has introduced problems in joining which have resulted in a major evaluation of the welding techniques suitable for application on these materials. The corrodibility of the materials useful in the atomic energy and rocket fields have caused great difficulties in the fabrication of required components. Heretofore, methods have been substantially limited to the application of the inert-gas shielded-arc welding processes for joining the materials, and the results of this work have been satisfactory for many applications. These efforts, however, have indicated several shortcomings in these processes which required the development of new and improved methods and apparatuses for use in fabricating these new materials.

The objectives of this invention are, therefore, to develop methods and apparatuses which will yield results superior to other methods of welding now available on reactive materials.

It is another object of this invention to develop methods and apparatuses for fusion welding in a high vacuum without introducing any contaminating material into the system as a part of the welding operation.

It is an object of this invention to develop methods and apparatuses for fusion welding which have a wide range of application without requiring extensive equipment modification.

It is also an object of this invention to develop methods and apparatuses for fusion welding which are suitable for application to production welding. Other objects and advantages of this invention will become apparent to those skilled in the art on a further reading of this specification.

In the methods and apparatuses according to this invention, the fusion welding is accomplished by subjecting the joint to be welded to a focused electron beam while maintaining it at a very low-pressure atmosphere. The kinetic energy of the electron beams bombarding the metal causes it to melt. If light fusion welds are required, the melting of the metal by the action of the bombarding electrons is sufficient to fuse the metals and so join them. If heavier welds are required, the electron beam may be caused to ionize the metallic vapor above the molten metal and establish an ionized vapor cloud between the electron source and the metal which will serve as a medium for an arc discharge therebetween.

This invention may be better understood with reference to the accompanying drawing which is a partially schematic view of a device useful in the application of this invention.

The figure in the drawing discloses a welding device 10 comprising a chamber 12 which may be evacuated through the valve means 14. Work piece 16 to be welded is shown residing within the chamber 12. The work piece comprises a cylindrical core 16a within a tubular sheath 16b and an end cap 16c which is to be welded to the sheath 16b at a circular region of contact therebetween. The work piece 16 rests on a pedestal 18 supported by a shaft 20 which extends through a rotating vacuum seal 22 in the bottom of the chamber 12. The shaft 20 may be connected to any type of mechanical drive (not shown) which will revolve it at a predetermined speed suitable for the particular welding operation to be accomplished. It is to be understood that the drive mechanism may be located completely within the evacuation chamber 12 to eliminate any vacuum seals and it may be arranged to drive work pieces of different shapes in any desired motion to accomplish a weld along a joint of almost any configuration.

The electron source comprises a filament 24 fabricated of pure tungsten or any other efficient thermionic emitter material. Alternating electric current is supplied for heating the filament 24 through wires 26 extending through a plug 28 to a transformer 30 supplied by an A.C. voltage source.

The electrons emitted from the heated filament 24, which operates as a cathode, are directed to the work piece 16, operating as an anode or as a target, by a potential field between the filament and the work piece. The potential field is established by means of a D.C. power supply 32 which superimposes a negative D.C. potential directly on the filament emitter 24. The positive terminal of the D.C. power supply 32 is grounded as is the pedestal 18, and hence the work piece 16, so that the work piece is at a positive potential with respect to the filament emitter 24.

The electrons emitted from the filament emitter 24 are electrostatically focused into a beam by focusing means 34 in which is provided an aperture 36 through which the electron beam passes. The focusing means 34 are at the same negative D.C. potential as the filament 24 as indicated by the connection at 38. The filament 24 is mechanically coupled to the focusing means 34 and they are vertically translatable by means of a rod 40 secured to the bottom of the chamber 12 so that the beam may be focused at any desired height within the chamber.

The above-described apparatus may be used in the processes for light welds as well as heavy welds. In the case of the heavy welds, however, a power supply must be selected which has a current capacity suitable to maintain an arc discharge between the filament emitter 24 and the work piece 16.

To fusion-weld pieces in the apparatus 10 the chamber 12 is evacuated to a pressure below the point where glow discharge would take place with the proper operating potential between the filament emitter 24 and the work piece 16. A pressure of the order of magnitude of approximately one micron of mercury or less is suitable for potentials up to 15,000 volts. The filament is resistance heated by the alternating current to an efficient emitting temperature appropriate to the filament material. For a filament of pure tungsten, this temperature would be approximately 2,600° Kelvin. The high negative potential is placed on the filament and focusing means so that electrons emitted from the cathode or filament 24 are accelerated to the anode or work piece 16. They are focused into a beam by means of the negative potential on the focusing means 34 so that they hit the work surfaces to be welded in a concentrated spot at the joint. When the accelerated electrons strike the anode work surfaces heat is generated by converting some of their kinetic energy into heat energy. When the heat input into the work pieces is greater than the ability of the material to conduct heat away from the localized area where the electron beam strikes, the metal melts. If a light weld is required, the above-described steps are sufficient to form a fusion weld between the parts. In the device shown in the drawing the cylindrical work piece 16 is rotated by the shaft 20 and pedestal 16 to effect a circular weld at its ends.

In the light weld process the energy input into the weld area is very soft. That is, no appreciable force is exerted on the molten puddle by the electron beam. As a result no appreciable crater can be observed at any time and the weld stopping point is difficult and sometimes impossible to detect when a circular weld is being made. This soft energy input makes the control of welds on thin material such as .005" very easy. No force tends to drive through and blow holes in the work piece. No appreciable surface disturbance or contour change is noted when comparing the fusion area with the adjacent base metal, and very wide fusion zones with respect to the work piece material thickness can be obtained thus assuring smooth notch-free welds.

If heavier welds are desired, the process hereinbefore described may be extended. It will be noted that a metal vapor is present over the melt region, the pressure of which is related to the properties of the specific metal being welded. The fast moving electrons ionize part of this vapor cloud over the melt. If the cloud of metal ions is permitted to rise to the point where the gap is bridged by these ions the proper conditions for an arc discharge is present. A stable arc will be formed and maintained provided a suitable power supply is used which has a current capacity suitable to support the transfer from the electron beam to an arc discharge. When ionization of the metal vapor has taken place there is a marked increase in the current between the heated tungsten filament and the work piece. A decrease in voltage between the filament and work piece also results indicating that the arc has a lower resistance than the electron beam. The heated filament continues to emit electrons by thermionic emission but these electrons are no longer sharply focused into a beam because of the change in the lines of force between the electrodes due to the presence of positive ions.

The above-described processes may be used to weld most of the common metals used today such as tungsten, molybdenum, titanium, nickel, zirconium and stainless steel alloys. As an example, the following listed conditions were found suitable for establishing a heavy weld using 304L stainless steel having a thickness of 3/16".

| | |
|---|---|
| Pressure | Approx. $6 \times 10^{-4}$ mm. of mercury. |
| Tungsten filament | Heated to approx. 2,600° K. |
| Voltage | 6,000 volts D.C. |
| Gap between filament and work pieces | 1/2". |
| Melt area | 3/16" diameter. |
| Current input | Approx. 40 milliamperes. |

It will be understood that the above-listed initial conditions are suitable to effect light welds on 304L stainless steel and may be so used when conditions dictate. To establish heavier welds, however, the ionized metal vapor cloud is permitted to build up to bridge the 1/2" gap between the filament and work piece. Since a high-current capacity power source is being used for heavier welds, it will maintain an arc through the vapor cloud medium. The arc further melts the metal at the joint and causes this to fuse to obtain a deeper weld.

When the arc is established the voltage across the arc drops to approximately 3,500 volts D.C. and the current increases to 180 milliamperes. Electrical grade copper 1/8" thick, when being welded by this process, causes the voltage across the arc to decrease to approximately 1,500 volts D.C. and the current to rise to approximately 180 milliamperes. Thus the electrical resistance in the arc for stainless steel is approximately 19,000 ohms and for the copper approximately 8,000 ohms. These values are about 1/10 the resistance found in the light weld process and many times greater than the resistance of a conventional welding arc.

While the limiting operating conditions will vary depending upon the material being welded and other circumstances, it appears that, for the light weld process (no arc discharge), a current as low as about one milliampere, and a voltage as low as about 1,000 volts, are operable. The power of the electron beam may be as low as 10 watts and as high as several thousand watts. For the heavy weld process involving an arc discharge, the current should be at least about 100 milliamperes and the voltage at least about 1,000 volts.

Since these processes must be carried out in very low-pressure atmospheres, they are ideally suited for use when contamination of the piece must be minimized. The pressure must be maintained at a value whereby a glow discharge will not occur at the potentials used so that welding is restricted to pressures of the order of magnitude of $1 \times 10^{-3}$ mm. of mercury. Thus, a minimum atmosphere of purity of 99.999987% surrounds the parts to be welded. This can be compared with welding-grade helium which is useful in inert gas shielding processes where a minimum purity of approximately 99.99% is standard. The atmosphere of extremely high purity completely surrounds the parts to be welded and eliminates the requirements for rapid quenching jigs to limit the time the weld area is at elevated temperature whereat it would be most subject to contamination.

The processes and apparatuses of this invention are particularly suitable for use in welding closures on containers so that the residual gas in the vessel is very small. In the fabrication of fuel elements for nuclear reactors it is essential that contaminating gases be removed from the interior when the fuel material is clad with a protective cover. This invention may be used to fabricate the fuel element with its protective cover in an evacuated atmosphere wherein contamination is reduced to a minimum.

While, in the drawings and foregoing description, the filament 24 has been shown and described as energized by alternating current, it will be readily apparent that the electric heating of the filament could equally well be accomplished by direct current. Also, for purposes of illustration and clarity of description, the voltage maintaining the electron beam has been described as a direct current voltage. If desired, an alternating current voltage could be employed to maintain the electron beam and the arc discharge, in which case D.C. power source 32 would be replaced by an A.C. power source.

Other applications of this invention will be obvious to one skilled in the art of fusion welding. It is therefore the intent of the inventors to be limited in their invention only by the scope of the appended claims.

What is claimed is:

1. A method for fusion welding comprising subjecting the joint to be welded to a spot-focused electron beam in an evacuated atmosphere of an order of magnitude of at least $1 \times 10^{-3}$ mm. of mercury, said electron beam being subjected to a potential of at least 1,000 volts until the metal at said joint is melted and the metal vapor emanating therefrom is ionized to establish an arc discharge, the current in said arc being at least of the order of magnitude of 100 milliamperes.

2. Apparatus for fusion welding metal pieces at a joint, comprising a high-vacuum evacuation chamber enclosing said metal pieces, an electron source within said chamber, means including a power supply for maintaining an electron beam between said electron source and said joint to be welded, said power supply being capable of imparting sufficient energy to said electron beam to melt the metal at the joint and ionize the metal vapor emanating therefrom to initiate an arc discharge between said joint and said electron source.

3. Apparatus for fusion welding metal pieces in a joint, comprising a chamber evacuated to a pressure of an order of magnitude of $1 \times 10^{-3}$ mm. of mercury enclosing said metal pieces, a thermionic filament emitter heated to an efficient emitting temperature within said evacuated chamber, a power supply having one terminal connected to said metal pieces and another terminal connected to said filament whereby electrons emitted from said filament are attracted to said work pieces, means for focusing said electrons into a beam, said power supply having a voltage of an order of magnitude of 6,000 volts and a current capacity of an order of magnitude of 180 milliamperes.

4. Apparatus for fusion welding metal pieces in a joint, comprising a chamber evacuated to a pressure of an order of magnitude of $1 \times 10^{-3}$ mm. of mercury enclosing said metal pieces, a thermionic filament emitter heated to an efficient emitting temperature within said evacuated chamber, a power supply having one terminal connected to said metal pieces and another terminal connected to said filament whereby electrons emitted from said filament are attracted to said work pieces, means for focusing said electrons into a beam, said power supply having a voltage of at least about 1000 volts and a current capacity at least about 100 milliamperes.

5. A method for fusion welding of a joint of a work piece comprising the steps of establishing an evacuated region of the order of magnitude of $5 \times 10^{-3}$ mm. mercury around said work piece, energizing a filamentary cathode to emit electrons in the vicinity of said work piece and within said region, establishing an initial electron beam of about 40 ma. between said cathode and said work piece by applying an initial potential of about 6,000 volts therebetween, focusing said electron beam on the joint to be welded, maintaining said electron beam at about 40 ma. for a period of time sufficient to ionize a bridge of metal vapor between said cathode and said work piece whereby an arc discharge between said cathode and work piece is established, and thereafter maintaining said arc discharge at a current of about 180 ma. and a voltage lower than said initial voltage while simultaneously causing said arc discharge to move along the joint.

References Cited in the file of this patent
UNITED STATES PATENTS

| | | |
|---|---|---|
| 2,778,926 | Schneider | Jan. 22, 1957 |
| 2,860,251 | Pakswer et al. | Mar. 11, 1958 |

FOREIGN PATENTS

| | | |
|---|---|---|
| 1,141,535 | France | Mar. 18, 1957 |